United States Patent [19]

Hasumi

[11] Patent Number: 4,692,777

[45] Date of Patent: Sep. 8, 1987

[54] MEANS FOR RESTORING LIQUID DISCHARGE FUNCTION OF A LIQUID JET RECORDER

[75] Inventor: Hiroyuki Hasumi, Hiratsuka, Japan

[73] Assignee: Canon Kabushiki Kaisha, Tokyo, Japan

[21] Appl. No.: 942,029

[22] Filed: Dec. 15, 1986

Related U.S. Application Data

[63] Continuation of Ser. No. 667,365, Nov. 1, 1984, abandoned.

[30] Foreign Application Priority Data

Nov. 8, 1983 [JP] Japan ................................ 58-208245

[51] Int. Cl.[4] ............................................ G01D 15/16

[52] U.S. Cl. ................................................ 346/140 R

[58] Field of Search ........................... 346/140 PD, 75

[56] References Cited

U.S. PATENT DOCUMENTS

| | | | |
|---|---|---|---|
| 4,176,363 | 11/1979 | Kasahara | 346/140 PD |
| 4,362,572 | 12/1982 | Wallace | 346/140 PD |
| 4,380,770 | 4/1983 | Maruyama | 346/140 R |
| 4,409,596 | 10/1983 | Ishii | 346/140 PD |
| 4,492,968 | 1/1985 | Lee | 346/140 PD |

*Primary Examiner*—E. A. Goldberg
*Assistant Examiner*—Mark Reinhart
*Attorney, Agent, or Firm*—Fitzpatrick, Cella, Harper & Scinto

[57] ABSTRACT

A liquid jet recorder comprises liquid droplet discharge means for discharging liquid droplets to print a record on a record medium, liquid droplet discharge function restoring means, and control means for controlling the liquid droplet discharge function restoring means in accordance with a rest time (non-print time) of the liquid jet recorder.

8 Claims, 8 Drawing Figures

MEANS FOR RESTORING LIQUID DISCHARGE FUNCTION OF A LIQUID JET RECORDER

This application is a continuation of application Ser. No. 667,365 filed Nov. 1, 1984, now abandoned.

BACKGROUND OF THE INVENTION

1. Field of the Invention

The present invention relates to a liquid jet recorder, and more particularly to a liquid jet recorder having means for restoring the liquid discharge function when liquid is not properly discharged.

2. Description of the Prior Art

A liquid jet recorder jets liquid as droplets to print dots on a record medium. A schematic view thereof is shown in FIG. 1.

FIG. 1 shows only major portions with a case removed. Numeral 1 denotes a liquid jet nozzle that acts as a liquid discharge means. The nozzle 1 is mounted on a carriage 2 which is horizontally reciprocated along a guide rod 3. Droplets are discharged from the nozzle 1 when it is at a predetermined print position so that dots are printed on a record paper (not shown) fed by a platen 4.

A sub-tank 5 is mounted on the carriage 2 and liquid such as ink is supplied to the sub-tank 5 from a main tank (not shown). The liquid such as ink is supplied from the sub-tank 5 to the liquid jet nozzle 1.

A liquid discharge function restoring pump 6 acts as a droplet discharge function restoring means and is arranged at the home-position of the recorder. When the liquid jet nozzle 1 is returned to the home position by the carriage 2, the jet nozzle 1 is engaged with the restoring pump 6.

The restoring pump 6 has vacuum means (not shown). As a user depresses a button 7 on the restoring pump 6 at the start of printing, a vacuum is generated so that the liquid such as ink is sucked from the liquid jet nozzle 1 to assure the discharge of droplets by the liquid jet nozzle.

It has been known that the longer the non-print time of the liquid jet nozzle 1 is, the higher is the defective print rate due to evaporation of the liquid at the end of the liquid jet nozzle 1.

This is illustrated in FIGS. 2 to 4.

FIG. 2 shows a relation between the non-print time of the liquid jet recorder and the defective print rate. It is seen that the defective print rate increases in proportion to the non-print time.

FIG. 3 shows the relation between a relative humidity and the non-print time for a given defective print rate and temperature, and FIG. 4 shows the relation between the temperature and the non-print time for a given defective print rate and humidity.

As seen from FIGS. 2 to 4, when the relative humidity is low and the temperature is low, a certain level of defective print rate occurs even if the non-print time is short.

In spite of the fact that the defective print rate largely relates to the non-print time, the prior art recorder merely controls a temporary minimum pressure of the sub-tank sucked by the restoring pump and the restoring function is effected by the manual operation by the user. Accordingly, if the non-print time is long, the defective print rate is high in spite of the restoring function.

SUMMARY OF THE INVENTION

It is an object of the prsent invention to provide a liquid jet recorder which positively restores a liquid discharge function irrespective of non-print time.

It is another object of the present invention to provide a liquid jet recorder comprising liquid discharge means for discharging droplets of liquid to print a record on a record paper, liquid discharge function restoring means and control means for controlling the liquid discharge function restoring means in accordance with the rest time (non-print time) of the liquid jet recorder.

In accordance with the present invention, the liquid discharge function is restored in accordance with the environment in which the liquid jet recorder is installed. Accordingly, a defective print at the start of printing is prevented and waste of liquid, electric power and time due to an excessive restoring operation is also prevented.

BRIEF DESCRIPTION OF THE DRAWINGS

FIGS. 1–4 relate to a prior art recorder in which

FIG. 1 is a perspective view of major portions of a liquid jet recorder,

FIG. 2 is a graph showing the relation between a non-print time and defective print rate, FIG. 3 is a graph showing the relation between relative humidity and non-print time, and FIG. 4 is a graph showing the relation between temperature and non-print time, FIGS. 5 and 6 relate to a first embodiment of the present invention in which

DETAILED DESCRIPTION OF THE PREFERRED EMBODIMENTS

Figure 1:
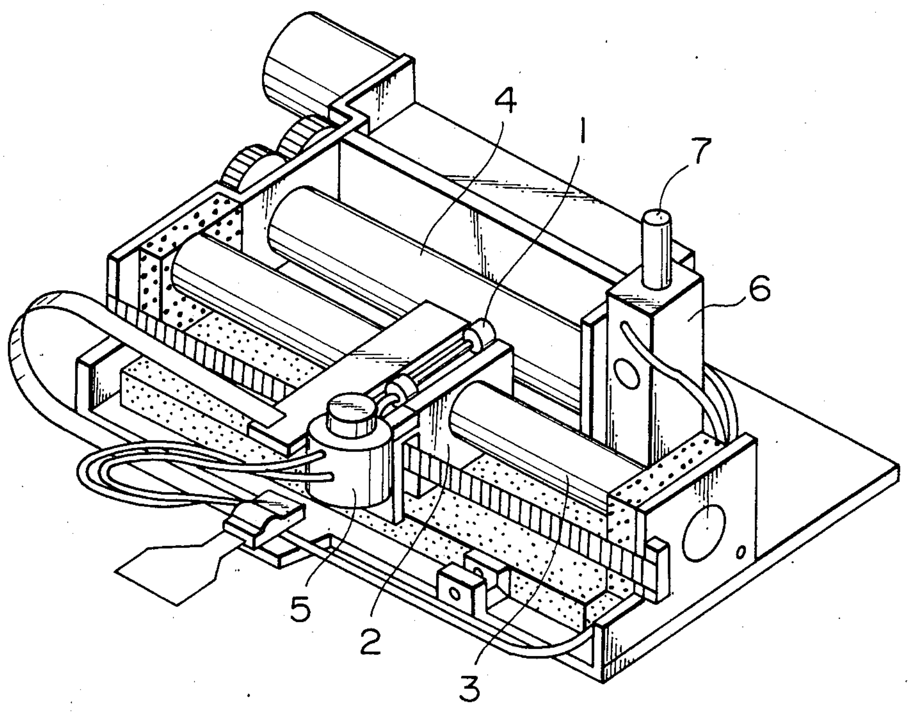
FIG. 1 PRIOR ART
Figure 2:
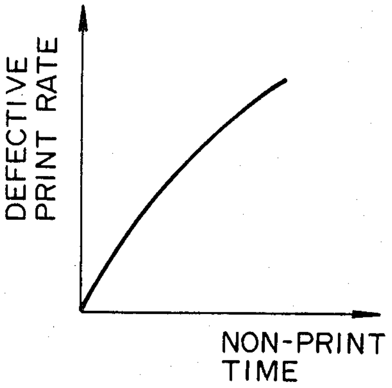
FIG. 2 PRIOR ART
Figure 3:
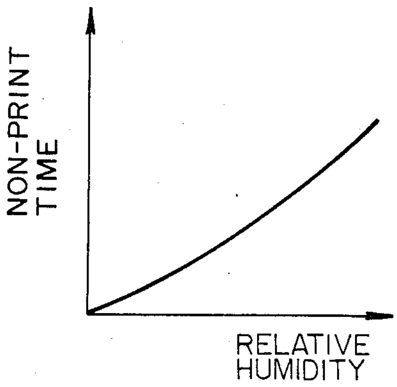
FIG. 3 PRIOR ART
Figure 4:
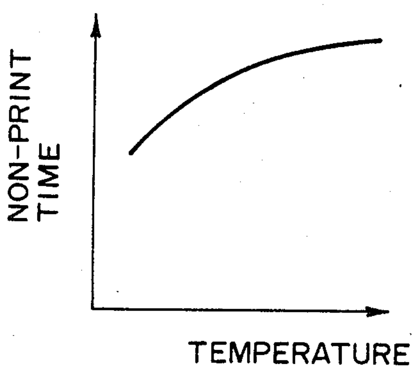
FIG. 4 PRIOR ART
Figure 5:
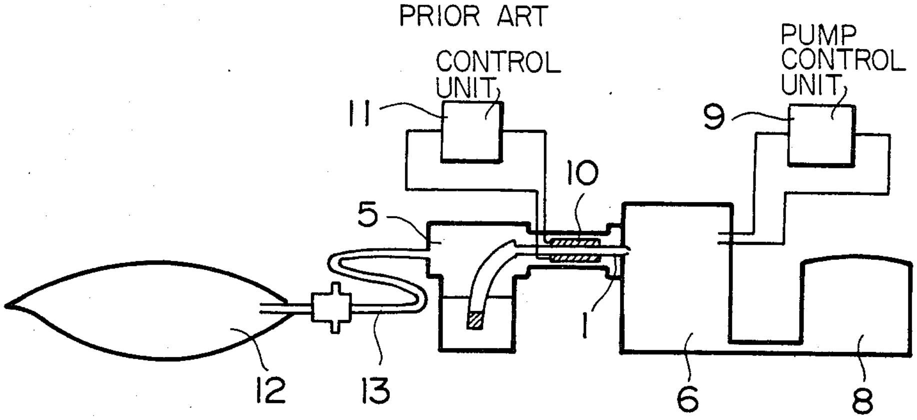
FIG. 5 is a schematic view of a liquid jet recorder.
Figure 6:
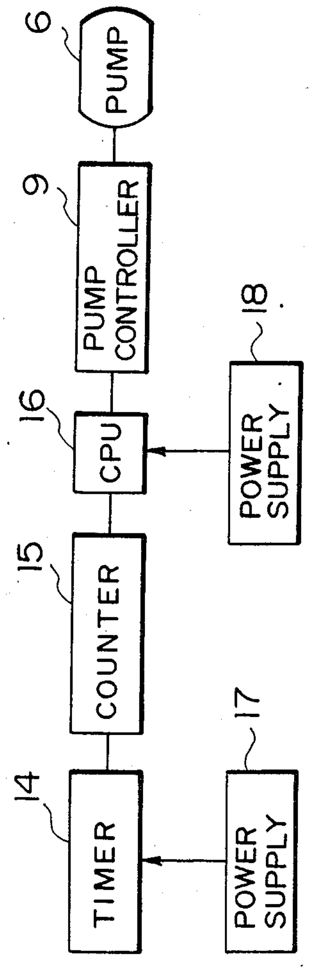
FIG. 6 is a block diagram of a control circuit.

FIGS. 5 and 6 relate to a first embodiment of the present invention. Like elements to those shown in FIG. 1 are designated by like numerals and the explanations thereof are omitted.

FIG. 5 is a schematic view of a recorder. An exhaust liquid bath 8 is connected to the restoring pump 6 and the restoring pump 6 is controlled by a pump control unit 9.

On the other hand, the liquid jet nozzle 1 has liquid discharge energy generating means 10. Such means 10 can be an electro-mechanical transducer such as a piezoelectric element or an electro-thermal transducer such as a heat generating resistor. The liquid discharge energy generating means 10 is controlled by a control unit 11.

The sub-tank 5 and a main tank 12 are connected through a tube 13 so that a desired quantity of liquid (ink) is always held in the sub-tank 5.

FIG. 6 shows a control circuit of the recorder. Numeral 14 denotes a timer which is connected to a counter 15, which is connected to a CPU 16 which controls the pump control unit 9.

The following control is effected in the present embodiment.

When a recording power supply 18 is turned off, the timer 14 which is energized by a separate power supply 17 from the recording power supply 18 is started so that a time period to the turn-on of the recording power supply 18 is counted by the counter 15.

This time period is always monitored by the CPU 16. When the recording power supply 18 is turned on, the pump control unit 9 controls the suction pressure of the pump 6 in accordance with the count of the counter 15, that is, the rest time of the recorder.

By controlling the suction pressure of the restoring pump 6 in accordance with the rest time of the recorder, the suction pressure of the liquid jet nozzle 1 is changed to assure the liquid discharge function restoring operation.

In accordance with the present embodiment, the suction pressure of the restoring pump for restoring the liquid discharge function is varied in accordance with the rest time (non-print time) of the recorder to prevent the non-discharge of the liquid. Accordingly, the defective print rate at the start of printing is remarkably reduced.

However, since the suction pressure of the restoring pump has a limit, some other means must be provided when the suction pressure required exceeds the limit of the restoring pump.

Figure 7:
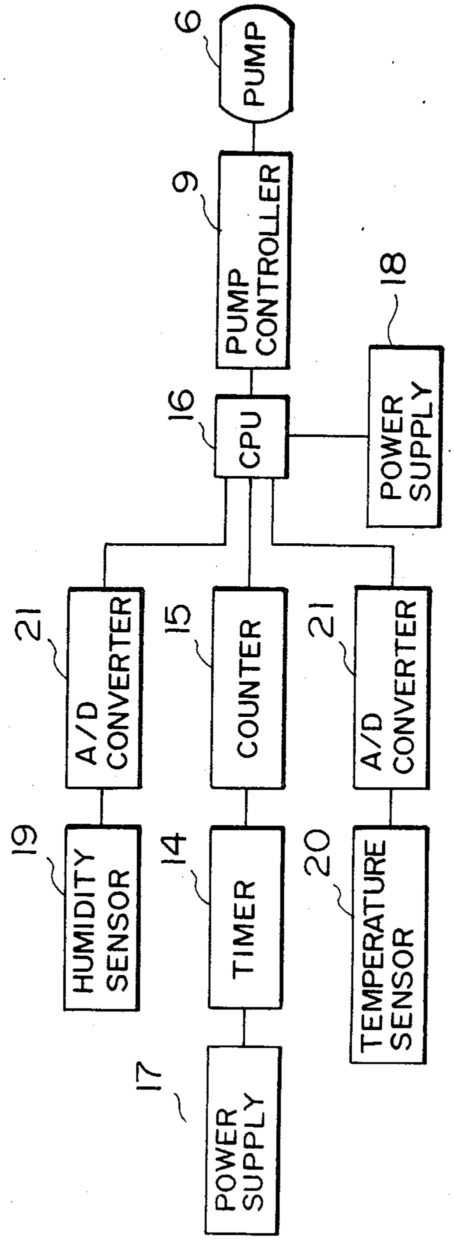
FIG. 7 is a block diagram of a second embodiment of the present invention.

FIG. 7 shows a block diagram of a second embodiment of the present invention. The like elements to those shown in FIG. 6 are designated by the like numerals and the explanation thereof is omitted.

In the present embodiment, a humidity sensor 19 and a temperature sensor 20 are connected to the CPU 16 through respective A/D converters 21.

In the present embodiment, the humidity and the temperature which are the causes of defective print can be adapted as factors to control the restoring pump so that more positive restoring operation is attained.

Because the suction pressure of the restoring pump 6 has a limit, the suction time is extended when the limit is exceeded so that sufficient restoring function is applied.

Figure 8:
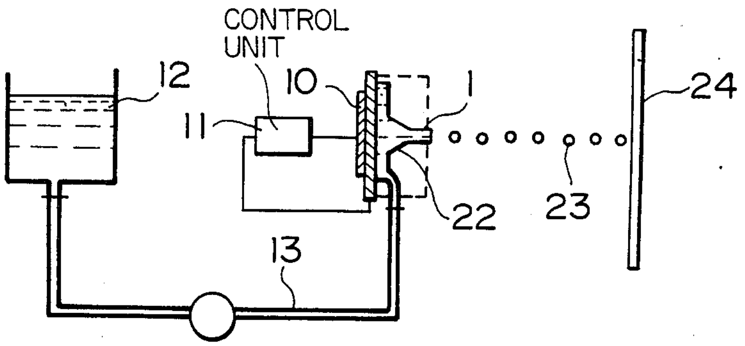
FIG. 8 is a schematic view of a third embodiment of the present invention.

FIG. 8 shows a third embodiment of the present invention, in which the like elements to those shown in FIGS. 1-7 are designated by the like numerals and the explanations thereof are omitted.

In FIG. 8, numeral 22 denotes an energy chamber 22 to which the liquid (ink) from the main tank 12 is supplied.

Pressure in the energy chamber 22 is imparted by the liquid discharge energy generating means 10 such as a piezoelectric element, which is controlled by the control unit 11.

Numeral 23 denotes droplets and numeral 24 denotes a record medium.

In accordance with the present embodiment, the restoring pump is not necessary because the big cause for non-discharge, that is, clogging of the nozzle is eliminated, and the energy by the liquid discharge energy generating means 10 is controlled by the control unit 11 to restore the liquid discharge function.

Namely, the liquid discharge function is restored by changing the energization time, amplitude and frequency applied to the liquid discharge energy generating means 10.

By controlling the energization time, amplitude and frequency in accordance with the rest time of the recorder, the humidity and the temperature, an optimum restoring function can be attained.

The liquid jet recorder of the present invention is not limited to the illustrated ones but a number of variations may be considered as required.

The liquid discharge means is not limited to the single nozzle type but it may have a plurality of liquid jet nozzles. It may be one as disclosed in U.S. Pat. No. 4,376,945.

What I claim is

1. A liquid jet recorder comprising:
liquid droplet discharge means for discharging liquid droplets to print a record on a record medium;
droplet discharge function restoring means for restoring said discharge means by performing at least one of a plurality of different discharge restoring functions; and
control means for selecting one of the functions of said droplet discharge function restoring means on the basis of the duration of the time period that said liquid jet recorder has rested without operation of said discharge means and controlling the selected function in accordance with the duration of the time period.

2. A liquid jet recorder according to claim 1 wherein said droplet discharge function restoring means comprises a vacuum suction mechanism for applying a suction to said discharge means to implement a discharge restoring function of said droplet discharge function restoring means, and said control means controls the suction pressure of said vacuum suction mechanism in accordance with the duration of the time period.

3. A liquid jet recorder according to claim 2 wherein said control means controls the suction time of said vacuum suction mechanism in accordance with the duration of the time period.

4. A liquid jet recorder according to claim 1 wherein said droplet discharge function restoring means comprises a mechanism for imparting vibration to an energy chamber to implement a discharge restoring function of said droplet discharge function restoring means, and said control means controls the vibration time of said vibration mechanism in accordance with the duration of the time period.

5. A liquid jet recorder according to claim 2 wherein said droplet discharge function restoring means comprises a mechanism for imparting vibration to an energy chamber to implement a second discharge restoring function of said discharge function restoring means, and said control means controls a vibration time of said vibration mechanism in accordance with the duration of the time period.

6. A liquid jet recorder according to claim 4 wherein said control means controls the amplitude of the vibration imparted to said energy chamber in accordance with the duration of the time period.

7. A liquid jet recorder according to claim 4 wherein said control means controls the frequency of the vibration imparted to said energy chamber in accordance with the duration of the time period.

8. A liquid jet recorder comprising:
liquid droplet discharge means for discharging liquid droplets to print a record on a recording medium;
droplet discharge function restoring means for restoring said discharge means by performing at least one of a plurality of different discharge restoring functions;
sensor means for sensing at least one of the environmental factors of temperature and humidity; and
control means for selecting one of the functions of said droplet discharge function restoring means and controlling said droplet discharge function restoring means in response to said sensor means.

* * * * *